US011761325B1

(12) United States Patent
Al-Dawsari

(10) Patent No.: US 11,761,325 B1
(45) Date of Patent: Sep. 19, 2023

(54) GAUGE CARRIER PROTECTIVE HOUSING

(71) Applicant: Saudi Arabian Oil Company, Dhahran (SA)

(72) Inventor: Mutrik M. Al-Dawsari, Dhahran (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 0 days.

(21) Appl. No.: 17/709,624

(22) Filed: Mar. 31, 2022

(51) Int. Cl.
  *G01D 11/10* (2006.01)
  *E21B 47/017* (2012.01)
  *E21B 17/07* (2006.01)
  *G01D 11/24* (2006.01)

(52) U.S. Cl.
  CPC ............ *E21B 47/017* (2020.05); *E21B 17/07* (2013.01); *G01D 11/10* (2013.01); *G01D 11/245* (2013.01)

(58) Field of Classification Search
  CPC .............................. G01D 11/10; G01D 11/245
  See application file for complete search history.

(56) References Cited

U.S. PATENT DOCUMENTS

| 4,628,995 A * | 12/1986 | Young | E21B 47/017 166/113 |
| 4,711,123 A * | 12/1987 | Christensen | E21B 47/017 175/48 |
| 4,979,563 A * | 12/1990 | Patel | E21B 47/017 73/706 |
| 5,320,169 A * | 6/1994 | Delatorre | F16F 3/10 166/113 |
| 6,655,452 B2 * | 12/2003 | Zillinger | E21B 47/06 175/48 |
| 7,090,010 B1 * | 8/2006 | Martin | E21B 47/017 166/250.11 |

OTHER PUBLICATIONS

No Author. "Hunting: Well Intervention Equipment, Slickline Tools." Hunting (http://www.hunting-intl.com/). No date. 9 pages.
No Author. "Hydraulic Wireline Jar, Manual D460." Logan Oil Tools, A Rubicon Product Brand. Aug. 2012. 14 pages.
No Author. "PRM5: Pressure and Temperature Downhole Memory Gauge." Metrolog, A Sercel Brand. France. No date (www.metrolog.com). 2 pages.
No Author. "Wireline Tools." American Completion Tools, 2002. Retrieved from https://americancompletiontools.com/ on Mar. 17, 2022. 2 pages.

* cited by examiner

*Primary Examiner* — Jamel E Williams
(74) *Attorney, Agent, or Firm* — Leason Ellis LLP

(57) ABSTRACT

A gauge carrier protective housing is provided including attributes that improve the overall structural integrity and minimizes the likelihood of damage to the sensors, including shock absorbing elements, and a protective tubular structure encasing a gauge carrier holding the one or more sensors.

16 Claims, 3 Drawing Sheets

GAUGE CARRIER PROTECTIVE HOUSING

RELATED APPLICATIONS

Not applicable.

FIELD OF THE INVENTION

This disclosure relates to operations performed and equipment utilized in conjunction with a subterranean well or wellbore and, in an embodiment described herein, more particularly to gauge carriers containing sensors for measurement of conditions in a subterranean well or wellbore.

DESCRIPTION OF RELATED ART

During the drilling phase and the production phase of a subterranean well and associated wellbore, monitoring information such as temperature, pressure or flow rate is collected frequently. Gauges or test instruments are known which are introduced into the wellbore to obtain this information.

The gauges are conveyed to the downhole monitoring location by a carrier apparatus (commonly referred to as bundle carriers or gauge carrier) that supports the gauges and associated components including one or more of the power supplies, batteries, communications support or memory for data storage. Generally, the gauge carrier is in the form if an elongate tubular section having a bore therethrough and which is threaded at its upper and lower ends for connection into a pipe string such as a drill string or a production string. As a result, fluids such as drilling or productions fluids flow through the pipe string by passing through the bore of the gauge carrier, and monitoring information can be collected.

Gauge carriers are inserted into a wellbore by wirelines and/or slicklines, and are used for both workover and logging operations. Logs can be obtained from the gauge carriers by wired communications, wireless communications, and/or can be stored in memory devices with the gauge carrier. These can be used to measure various properties in the downhole environment during various stages of production or in abandoned wells. During production, these measurements can be used to help geologists, drillers and engineers make real-time decisions about drilling operations, and can include resistivity, conductivity and formation pressure, as well as sonic properties and wellbore dimensions. In abandoned wells, conditions can be monitored, for example, to determine how to treat the wellbore or other wellbores, as an observation well, and/or to alleviate environmental concerns.

An embodiment of a known gauge carrier is shown in FIG. 1. In the conventional assembly in FIG. 1, a gauge carrier 10 includes an elongated supporting body carrying a battery pack (for instance, at location 16 on the body) and one or more sensors. Such gauges are commercially available from several vendors, including for example Sercal SA, France under the trade name "Metrolog," for instance model PRM5 or other suitable models. The gauge carrier 10 includes opposing ends 12 and 14 that are configured and dimensioned for direct connection within a tool string of a wireline or slickline assembly (not shown). The ends are dimensioned and configured, and have suitable structural features, to attach to the tool string from the top (end 12), and a terminal end on the bottom (end 14). For example, in conventional arrangements the structural features are mating threaded arrangements that are directly connected to the tool string in downhole operations.

The one or more sensors are known for measurement of pressure and/or temperature, or other conditions or environmental characteristics such as the presence or absence of certain chemical compounds. As is known in the art, sensors of the gauge are mounted within a cavity that is configured and dimensioned on the body to fit the sensor(s), as well as optional related components and/or auxiliary sensors and optional components (not shown). The sensor(s) is/are exposed to the ambient environment of oil well borehole in order to obtain accurate measurements of the surroundings.

In the conventional direct connections of the gauge carrier on a tool string, the device is directly attached, and the sensor(s) are exposed to the ambient fluids. The sensors and components within the gauge carrier are subjected to damage due to lateral shocks and impacts.

Certain improvements have been proposed in gauge carriers, including U.S. Pat. Nos. 4,711,123, 4,628,995, 5,320, 169, 6,655,452, which are incorporated by reference herein for their background teachings related to the operation and use of gauge carriers. However, despite advances in the art, a need exists for improvements in the utilization of gauge carriers.

SUMMARY OF THE INVENTION

Provided herein is a gauge carrier protective housing that integrated one or more features that improve the overall structural integrity and minimizes the likelihood of damage to the gauge carrier and the sensors therein. In certain embodiments the gauge carrier protective housing includes a protective tubular structure encasing the gauge carrier. In certain embodiments the gauge carrier protective housing includes shock absorbing elements.

A gauge carrier protective housing is provided for use on a tool string of a wireline or a slickline that passes through a well borehole which traverses earth formations and contains fluid. The gauge carrier protective housing is for use with a gauge carrier having one or more sensors exposed to the fluid in the well borehole when in operation. Elements of the gauge carrier protective housing comprise: a protective tubular structure encasing a gauge carrier, a first shock absorbing assembly, and a second shock absorbing assembly. The protective tubular structure is dimensioned and configured to surround a gauge carrier with the first shock absorbing assembly on a first end of protective tubular structure corresponding to a first end of a gauge carrier and the second shock absorbing assembly on a second end of the protective tubular structure corresponding to a second end of a gauge carrier. The protective tubular structure is characterized by an outer wall and an inner wall, wherein in operation the outer wall faces a well borehole and is in contact with fluid in the well borehole, and wherein the inner wall is configured to face a gauge carrier and the first and second shock absorbing assemblies. The protective tubular structure has a plurality of apertures to permit passage of fluid from the well borehole to one or more sensors exposed to fluid and that are carried on a gauge carrier.

In certain embodiments, the protective tubular structure has a first end configured and dimensioned to attach to a tool string.

In certain embodiments, the protective tubular structure has a first end configured and dimensioned to attach to a tool string, and the first end of the protective tubular structure is attached to a coupling that is configured and dimensioned to attach to the tool string.

In certain embodiments, the protective tubular structure has a first end configured and dimensioned to attach to a tool string, and the protective tubular structure has a second end configured and dimensioned to attach to one of an additional section of the tool string, a wireline link jar, a gauge cutter or a terminal end. In certain embodiments, the second end of the protective tubular structure is attached to an adapter that is configured and dimensioned to attach to one of an additional section of the tool string, the wireline link jar, the gauge cutter or the terminal end. For example, the coupling can be provided with a string-side connecting structure that is configured and dimensioned to connect to the tool string, and a tube-side connecting structure that is configured and dimensioned to connect to the first end of the protective tubular structure; and the adapter has a string-side connecting structure that is configured and dimensioned to connect to one of an additional section of the tool string, the wireline link jar, the gauge cutter or the terminal end, and a tube-side connecting structure that is configured and dimensioned to connect to the second end of the protective tubular structure. In certain embodiments, the first shock absorbing assembly comprises a first spring retainer proximate to tube-side connecting structure of the coupling, a connecting structure configured and dimensioned for connection to a first end of a gauge carrier, a second spring retainer proximate to the connecting structure of the first shock absorbing assembly, and a spring between the first and second spring retainers; and the second shock absorbing assembly comprises a first spring retainer proximate to tube-side connecting structure of the adapter, a connecting structure configured and dimensioned for connection to a second end of a gauge carrier, a second spring retainer proximate to the connecting structure of the second shock absorbing assembly, and a spring between the first and second spring retainers.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

DETAILED DESCRIPTION OF CERTAIN EMBODIMENTS

Structural Description

Figure 1:
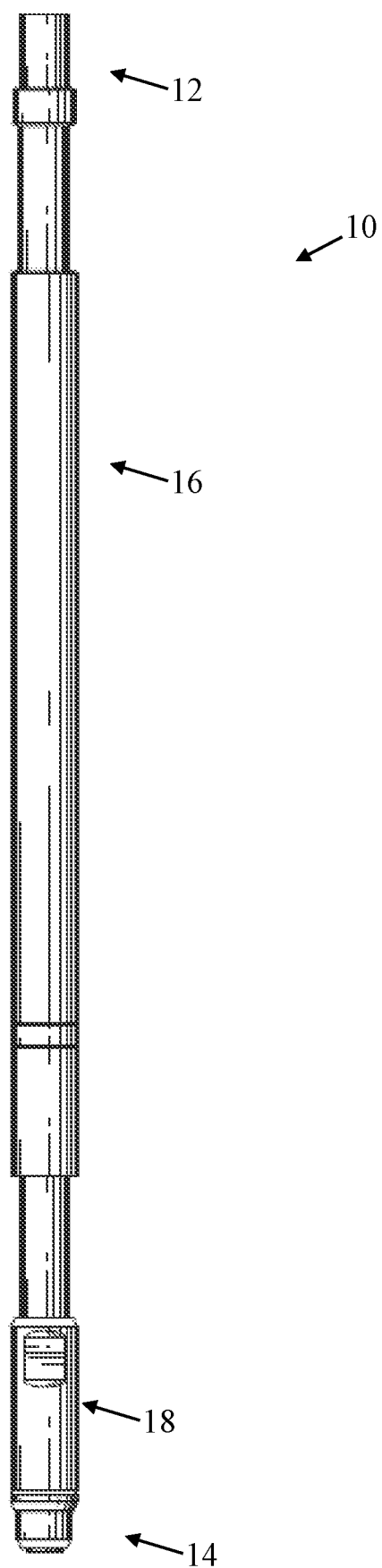
FIG. 1 is a schematic depictions of a conventional gauge carrier.

Referring to FIGS. 2, 3A, 3B, 4A, 4B, 5 and 6, an embodiment of a gauge carrier protective housing is depicted, with separate views of the components. A gauge carrier protective housing 50 includes a tubular structure 60 encasing a gauge carrier, such as the gauge carrier 10 depicted with respect to FIG. 1, which contains one or more sensors as is conventionally known, including one or more sensors that are typically exposed to the fluids within a wellbore for accurate measurements. In the depiction of FIGS. 2, 3A, 3B, 4A, 4B, 5 and 6, the gauge carrier itself containing the one or more sensors for measurement of pressure and/or temperature is not shown. In general, as is known in the art, the generally cylindrical and elongated gauge carrier carrying one or more sensors is adapted for direct coupling to a tool string of a wireline or slickline. The gauge carrier generally has an outer wall and at least one recess in said outer wall, said recess having sufficient depth to accommodate therein one or more sensors for measurement of conditions such as pressure and/or temperature, or other conditions or environmental characteristics such as the presence or absence of certain chemical compounds. Other aspects not shown in the figures herein and which are not pertinent to the invention herein include but are not limited to variations in the sensors, cavity, or other features of the gauges (such as wired or wireless communications connectivity, memory, power, or types and quantities or sensors), structural components and features to hold the gauges within the mandrel cavity such as bushings and the like, and longitudinal apertures for wire passage.

Figure 2:
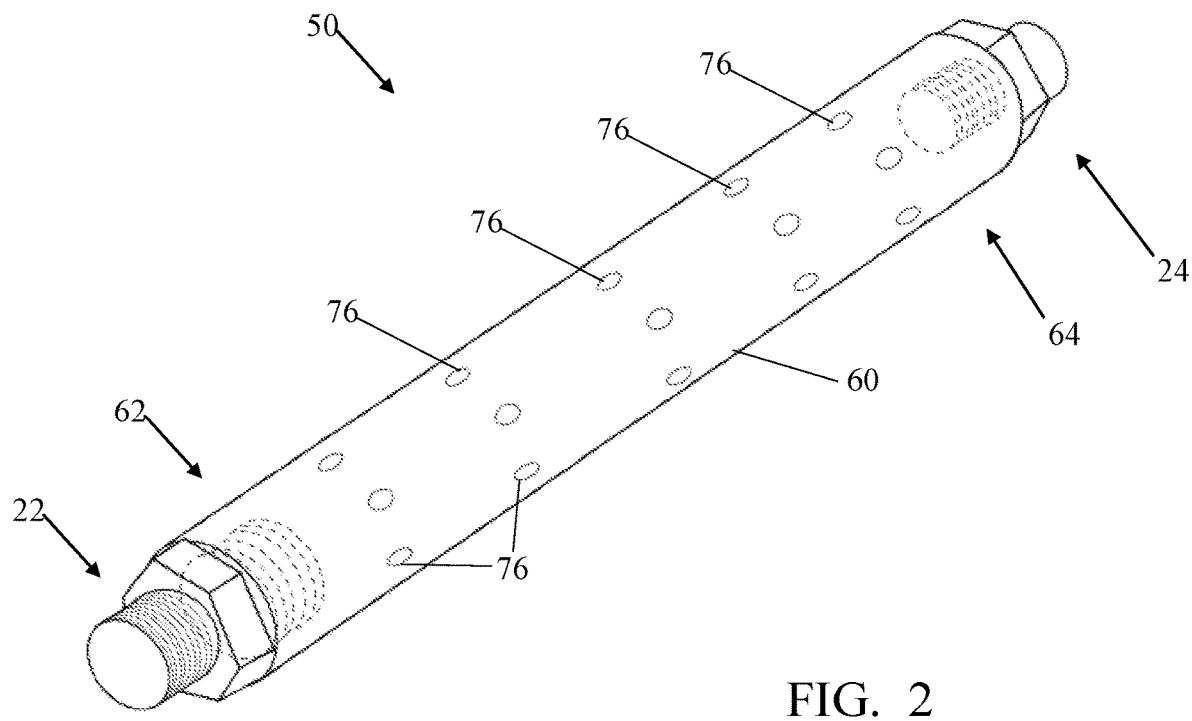
FIG. 2 is an isometric view of a gauge carrier protective housing.
Figure 3A:
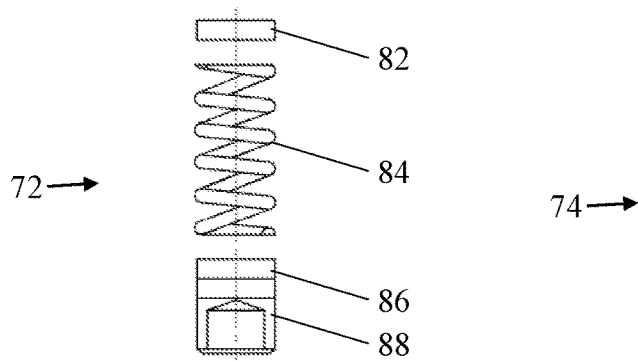
FIGS. 3A and 3B are views of a top spring assembly and a bottom spring assembly, respectively, used in the gauge carrier protective housing of the present disclosure.
Figure 3B:
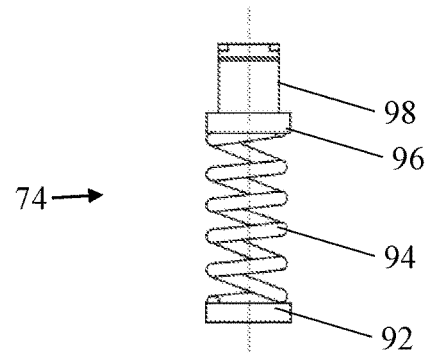
Figure 4A:
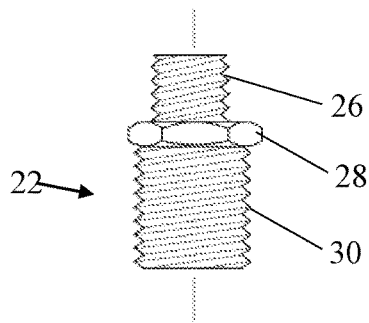
FIGS. 4A and 4B are views of a top sub and a bottom sub, respectively, used in the gauge carrier protective housing of the present disclosure.
Figure 4B:
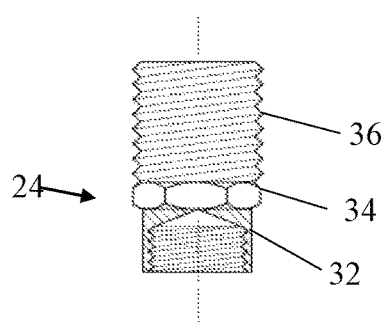
Figure 5:
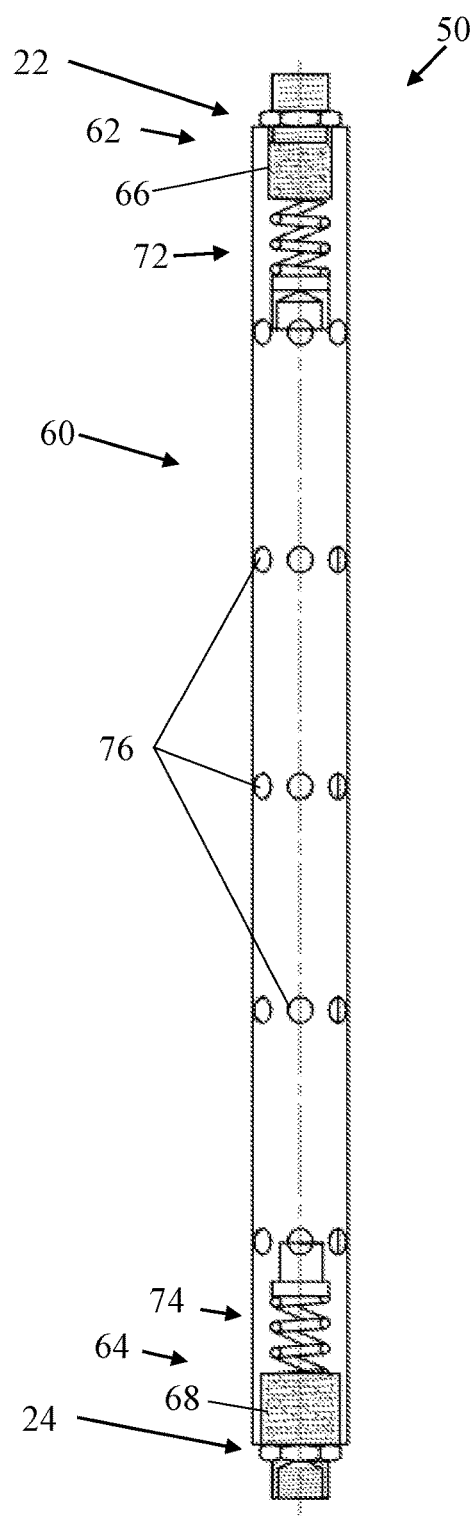
FIG. 5 is a sectional view of the gauge carrier protective housing of the present disclosure.
Figure 6:
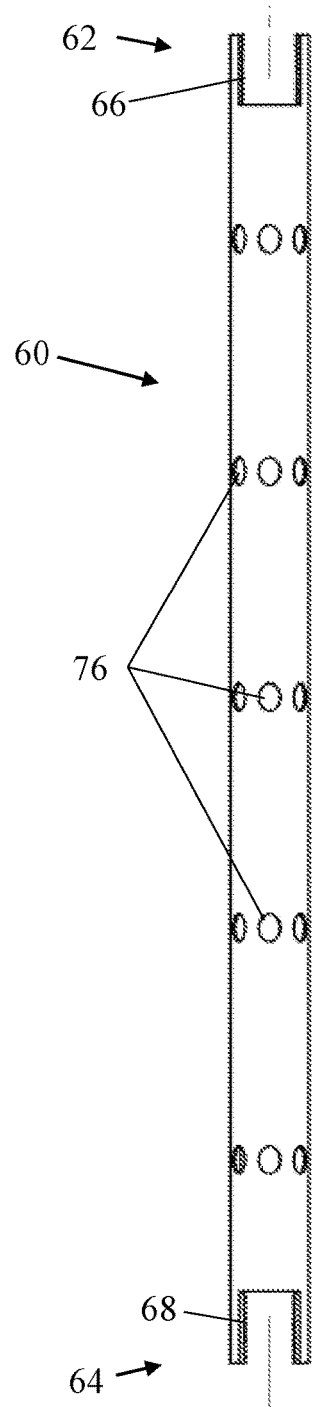
FIG. 6 is a sectional view of the tubular structure used in the gauge carrier protective housing of the present disclosure.

In the embodiments disclosed herein, the gauge carrier is enclosed and protected within the tubular structure 60 of the gauge carrier protective housing 50. FIG. 2 is an isometric view of the gauge carrier protective housing 50 of the present disclosure, with certain internal components shown in dashed lines for clarity of exposition. FIGS. 3A and 3B are a side views of a first shock absorbing assembly 72 and a second shock absorbing assembly 74, respectively. FIGS. 4A and 4B are side views of a top sub 22 (also referred to as a coupling) and a bottom sub (also referred to herein as an adapter). The coupling 22 includes a string-side top sub connecting structure 26 and a tube-side top sub connecting structure 30, with a nut portion 28 therebetween to facilitate attachment to the tubular structure 60 and a tool string; the adapter 24 includes a terminal side or string-side bottom sub connecting structure 32 and a tube-side bottom sub connecting structure 36, with a nut portion 34 therebetween to facilitate attachment to the tubular structure 60 and a tool string or other device. FIG. 5 is a side view of the gauge carrier protective housing 50. FIG. 6 is a side view of the tubular structure 60 of the gauge carrier protective housing 50.

As shown in FIGS. 2, 5 and 6, the tubular structure 60 includes a first end 62 and a second end 64. The first end 62 is connected to the top sub 22 and the second end 64 is connected to the bottom sub 24 when the gauge carrier protective housing 50 is connected in a tool string of a wireline or a slickline for downhole operations. In certain embodiments, a first connecting structure 66, which is an internal threaded receptacle, is provided at the first end 62 and is threadedly connected with a tube-side connecting structure 30. The tube-side connecting structure 30 is an external threaded post, at one end of the coupling 22. The external threaded post of the tube-side connecting structure 30 is configured and dimensioned, and possesses threads of appropriate pitch and dimensions, to connect to the first connecting structure 66 which contains mating internal threads. A second connecting structure 68, which is an internal threaded receptacle, is provided at the second end 62, is threadedly connected with a tube-side connecting structure 36 of the adapter 24, which is an external threaded post. The internal threaded receptacles described herein are also known as "female" threaded receptacles, and the external threaded posts described herein are also known as "male" threaded posts.

The protective tubular structure is provided to protect the gauge carrier and/or the one or more sensors carried thereon from damage because of direct and indirect lateral impact, for instance due to solid objects in the ambient fluids. In addition, shock absorbing elements are included at each end between the gauge carrier and the tool string connection elements (the coupling 22 and the adapter 24) to protect the gauge carrier and/or the one or more sensors carried thereon from damage due to longitudinal shocks. As shown in FIG. 2 (dashed lines) and in FIG. 4 (partial cut-away views), these shock absorbing elements include a first and second shock absorbing assemblies 72 and 74 at the first end 62 and the second end 64, respectively, and which are positioned within the protective tubular structure 60.

Referring to FIG. 3A, the first shock absorbing assembly 72 includes a first spring retainer 82 at the end proximate to the coupling 22, a spring 84, a second spring retainer 86 at the end proximate to the gauge carrier, and a connecting structure 88 for connection to the gauge carrier. In the embodiment of FIGS. 2-6, the connecting structure 88 includes an internal threaded receptacle and is threadedly connected with an external threaded surface of the gauge carrier, for instance at the end 12 of the gauge carrier 10 of FIG. 1. When the first shock absorbing assembly 72 is installed in the protective tubular structure 60, The first spring retainer 82 of the first shock absorbing assembly 72 abuts the tube-side connecting structure 30 of the coupling 22, the second spring retainer 86 of the first shock absorbing assembly 72 abuts the connecting structure 88, and the connecting structure 88 is coupled to a first end of the gauge carrier. Referring to FIG. 3B, the second shock absorbing assembly 74 includes a first spring retainer 92 at the end proximate to the adapter 24, a spring 94, a second spring retainer 96 at the end proximate to the gauge carrier, and a connecting structure 98 for connection to the gauge carrier. When the second shock absorbing assembly 74 is installed in the protective tubular structure 60, the first spring retainer 92 of the second shock absorbing assembly 74 abuts the tube-side connecting structure 36 of the adapter 24, the second spring retainer 96 of the second shock absorbing assembly 74 abuts the connecting structure 98, and the connecting structure 98 is coupled to a second end of the gauge carrier. In the embodiment of FIGS. 2-6, the connecting structure 88 includes an external threaded surface and is threadedly connected with an internal threaded surface of the gauge carrier, for instance at the end 12 of the gauge carrier 10 of FIG. 1; the connecting structure 98 includes an internal threaded surface and is threadedly connected with an external threaded surface of the gauge carrier, for instance at the end 14 of the gauge carrier 10 of FIG. 1. However, it is understood that the configurations of the connecting structures 88 and 98 can be varied based on the corresponding ends of the gauge carrier.

The springs of the first shock absorbing assembly 72 and the second shock absorbing assembly 74 can be made of a suitable material for the environment, including stainless steel, and is of suitable dimension, for instance with a length in the range of about 4-6, 4.5-6, 4-5.5, or 4.5-5.5 centimeters (cm), an outer diameter in the range of about 2-3, 2.2-3, 2-2.8 or 2.2-2.8 cm, and a wire thickness of about 2.8-3.8, 3-3.8, 2.8-3.6 or 3-3.6 mm; in an example, a suitable stainless steel spring has a length of about 5.1 cm (about 2 inches), an outer diameter of about 2.5 cm (about 1 inch) and a wire thickness of about 3.3 millimeters (mm) (about 0.13 inches).

The overall gauge carrier protective housing 50, including the protective tubular structure 60 are dimensioned and configured to surround the gauge carrier, with shock absorbing elements on each end thereof. The gauge carrier having the sensor(s) thereupon is as described herein and as is known in the art. The protective tubular structure 60 generally has an outer wall and an inner wall, whereby the outer wall faces the well borehole and is in contact with the well borehole which traverses earth formations and contains a fluid, and whereby the inner wall faces the gauge carrier and the shock absorbing assemblies 72, 74. For example, suitable overall dimensions for certain embodiments of the protective tubular structure 60 include: a length of about 30-100, 30-80, 30-70, 40-100, 40-80, 40-70, 50-100, 50-80 or 50-70 cm; and an outer diameter of about 30-60, 30-50, 30-40, 33-60, 33-50 or 33-40 cm. Suitable dimensions include those can encase, commonly used gauge carriers, for instance having dimensions including a length of about 50-70 cm and an outer diameter of about 32 mm (1.25 inches). Suitable wall thicknesses of the protective tubular structure 60 are about 4-6, 4.5-6, 4-5.5, or 4.5-5.5 mm, for example about 5.1 mm (0.2 inches).

Suitable gauge carriers for use with the protective tubular structure 60 of the present invention have externally threaded posts on each end thereof, for example, each having a length of about 2-3, 2.2-3, 2-2.8 or 2.2-2.8 cm, and a diameter of about 3-4, 3.2-4, 3-3.8 or 3.2-3.8 cm, for example about 2.5 cm (about 1 inch) in length and 3.6 cm in diameter (about 1.4 inches); a suitable thread pitch is used, for example about 10 UNS units (Unified Special Thread, as defined by the American Society of Mechanical Engineers). Accordingly, the ends of the protective tubular structure 60 have internally threaded receptacles on each end thereof, for example, each having corresponding lengths, diameters and pitches to correspond with the mating externally threaded posts:

The protective tubular structure 60 includes a plurality of ports 76 along the tube wall extending from the outer surface through the wall to the inner surface. The ports are of suitable quantity, location, configuration and dimension to permit passage of the fluid being measured/analyzed, while also protecting the internal workings of the gauge and associated components from impact from solids that are carried in the fluid and other objects that could be encountered in the oil well borehole. For example, in the embodiment shown in the figures, there are five sets of three ports 76. In certain embodiments, a suitable diameter and configuration for each of the plurality of holes is in about having a diameter of about 10-20, 10-18, 10-16, 12-20, 12-18 or 12-16 millimeters. In certain embodiments, the ports can be arranged in groups at certain vertical positions on the protective tubular structure 60, so that plural ports are at several vertical positions. In certain embodiments, the groups of ports are equally spaced apart along the length of the protective tubular structure 60 (but not including the portions of the tubular structure 60 that covers the first and second shock absorbing assemblies 72 and 74). In certain embodiments, the ports within a group of ports are spaced equally about the circumference of the tubular structure 60. In certain embodiments, the ports within a group of ports are spaced equally about a half of the circumference of the tubular structure 60 corresponding to the side where the sensor(s) is/are located to optimize fluid contact with the sensor(s). In other embodiments, the ports can be provided in another pattern, for instance, helically about the tubular structure 60.

In certain embodiments, the first end is connected to a tool string of a wireline or a slickline, for instance, with the coupling 22 described herein. In certain embodiments, the second end is connected to another section of the tool string. In certain embodiments, the second end is connected to another device, such as a wireline link jar, a gauge cutter, or a terminal end. The second end can be connected to another section of the tool string or another tool, for instance, with the adapter 24. Accordingly, the gauge carrier protective housing 50 is adapted for interconnection in a string of pipe where the string of pipe and gauge carrier can be disposed in a wellbore traversing earth formations for measuring pressure and temperature conditions in the oil well borehole.

Suitable materials of construction for the protective tubular structure 60, the top and bottom subs, and the first and second shock absorbing element include oxidation-corrosion-resistant materials, such as nickel-chrome-based super alloys available under the trade name Inconel, and/or stainless steels such as martensitic precipitation-hardening stainless steel (for instance 17-4 PH stainless steel used for sour services in the presence of hydrogen sulfide, carbon dioxide and/or acids) or nickel-cobalt base alloys (for instance MP35N® alloys).

The notable features of the gauge carrier that are impacted by the tubular shock absorber apparatus are the sensors which are open to the ambient environment of oil well borehole. In conventional gauge carriers, the ends are threaded connectors directly attached to the tool string of a wireline or slickline. However, using the gauge carrier protective housing 50 herein, the ends of the conventional gauge carrier are contained within the with the tubular structure 60. Further, in conventional gauge carriers, the sensor(s), and optional related components and/or auxiliary sensors with optional components, are subject to damage because of lateral impacts during operations. However, using the gauge carrier protective housing 50 herein, these problems related to damage to said sensor(s), and optional related components and/or auxiliary sensors with optional components, are overcome because of the protective tubular structure 60. In addition, in certain conventional arraignments, the direct connection of the gauge carrier to the tool string of the wireline or slickline subjecting the sensors and other components to damage because of longitudinal shocks and impacts. However, using the gauge carrier protective housing 50 herein, these problems related to longitudinal impacts are overcome because the first and second shock absorbing assemblies 72 and 74 are provided between the gauge carrier and the tool string. In addition, these first and second shock absorbing assemblies 72 and 74 themselves are maintained in place and protected by the features of the tubular structure 60.

It is to be understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms ""including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all technical and scientific terms used herein have the same meaning as commonly understood by one of ordinary skill in the art to which this invention belongs. In case of conflict, the present specification, including definitions, will control. Although methods and materials similar or equivalent to those described herein can be used in the practice or testing of embodiments of the present invention, suitable methods and materials are described below. In addition, the materials, methods, and examples are illustrative only and not intended to be limiting.

When a value or parameter is given as either a range, preferred range or a list of upper preferable values and/or lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Notably, the figures and examples above are not meant to limit the scope of the present disclosure to a single implementation, as other implementations are possible by way of interchange of some or all the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

The invention claimed is:

1. A gauge carrier protective housing for use on a tool string of a wireline or a slickline that passes through a well borehole which traverses earth formations and contains fluid, the gauge carrier protective housing for use with a gauge carrier having one or more sensors exposed to the fluid in the well borehole when in operation, the gauge carrier protective housing comprising:
   a protective tubular structure encasing a gauge carrier, a first shock absorbing assembly, and a second shock absorbing assembly, the protective tubular structure
      dimensioned and configured to surround a gauge carrier with the first shock absorbing assembly on a first end of the protective tubular structure corresponding to a first end of a gauge carrier and the second shock absorbing assembly on a second end of the protective tubular structure corresponding to a second end of a gauge carrier,
      having an outer wall and an inner wall, wherein in operation the outer wall faces a well borehole and is in contact with fluid in the well borehole, and wherein the inner wall is configured to face a gauge carrier and the first and second shock absorbing assemblies, and
      having a plurality of apertures to permit passage of fluid from the well borehole to one or more sensors exposed to fluid and that are carried on a gauge carrier.

2. The gauge carrier protective housing as in claim 1, wherein the first end of the protective tubular structure is configured and dimensioned to attach to a tool string.

3. The gauge carrier protective housing as in claim 2, wherein the first end of the protective tubular structure is attached to a coupling that is configured and dimensioned to attach to the tool string.

4. The gauge carrier protective housing as in claim 2, wherein the second end of the protective tubular structure is configured and dimensioned to attach to one of an additional section of the tool string, a wireline link jar, a gauge cutter or a terminal end.

5. The gauge carrier protective housing as in claim 3, wherein the second end of the protective tubular structure is attached to an adapter that is configured and dimensioned to attach to one of an additional section of the tool string, the wireline link jar, the gauge cutter or the terminal end.

6. The gauge carrier protective housing as in claim 5, wherein:
   the coupling has a string-side connecting structure that is configured and dimensioned to connect to the tool string, and a tube-side connecting structure that is configured and dimensioned to connect to the first end of the protective tubular structure; and
   the adapter has a string-side connecting structure that is configured and dimensioned to connect to one of an additional section of the tool string, the wireline link jar, the gauge cutter or the terminal end, and a tube-side connecting structure that is configured and dimensioned to connect to the second end of the protective tubular structure.

7. The gauge carrier protective housing as in claim 6, wherein:
   the first shock absorbing assembly comprises a first spring retainer proximate to tube-side connecting structure of the coupling, a connecting structure configured and dimensioned for connection to a first end of a gauge carrier, a second spring retainer proximate to the connecting structure of the first shock absorbing assembly, and a spring between the first and second spring retainers; and
   the second shock absorbing assembly comprises a first spring retainer proximate to tube-side connecting structure of the adapter, a connecting structure configured and dimensioned for connection to a second end of a gauge carrier, a second spring retainer proximate to the connecting structure of the second shock absorbing assembly, and a spring between the first and second spring retainers.

8. The gauge carrier protective housing as in claim 1, further comprising a gauge carrier within the protective tubular structure and between the first shock absorbing assembly and the second shock absorbing assembly.

9. A gauge carrier protective housing for use on a tool string of a wireline or a slickline that passes through a well borehole which traverses earth formations and contains fluid, the gauge carrier protective housing for use with a gauge carrier having one or more sensors exposed to the fluid in the well borehole when in operation, the gauge carrier protective housing comprising:
   a protective tubular structure encasing a gauge carrier, a first shock absorbing assembly, and a second shock absorbing assembly, the protective tubular structure
      dimensioned and configured to surround a gauge carrier with the first shock absorbing assembly on a first end of the protective tubular structure corresponding to a first end of a gauge carrier and the second shock absorbing assembly on a second end of the protective tubular structure corresponding to a second end of a gauge carrier,
      having an outer wall and an inner wall, wherein in operation the outer wall faces a well borehole and is in contact with fluid in the well borehole, and wherein the inner wall is configured to face a gauge carrier and the first and second shock absorbing assemblies, and
      having a plurality of apertures to permit passage of fluid from the well borehole to one or more sensors exposed to fluid and that are carried on a gauge carrier,
   wherein the first end of the protective tubular structure is attached to a coupling that is configured and dimensioned to attach to the tool string, the coupling having a string-side connecting structure that is configured and dimensioned to connect to the tool string, and a tube-side connecting structure that is configured and dimensioned to connect to the first end of the protective tubular structure;

the second end of the protective tubular structure is attached to an adapter that is configured and dimensioned to attach to one of an additional section of the tool string, the wireline link jar, the gauge cutter or the terminal end, the adapter having a string-side connecting structure that is configured and dimensioned to connect to one of an additional section of the tool string, the wireline link jar, the gauge cutter or the terminal end, and a tube-side connecting structure that is configured and dimensioned to connect to the second end of the protective tubular structure.

10. The gauge carrier protective housing as in claim 9, wherein:

the first shock absorbing assembly comprises a first spring retainer proximate to tube-side connecting structure of the coupling, a connecting structure configured and dimensioned for connection to a first end of a gauge carrier, a second spring retainer proximate to the connecting structure of the first shock absorbing assembly, and a spring between the first and second spring retainers; and the second shock absorbing assembly comprises a first spring retainer proximate to tube-side connecting structure of the adapter, a connecting structure configured and dimensioned for connection to a second end of a gauge carrier, a second spring retainer proximate to the connecting structure of the second shock absorbing assembly, and a spring between the first and second spring retainers.

11. The gauge carrier protective housing as in claim 9, further comprising a gauge carrier within the protective tubular structure and between the first shock absorbing assembly and the second shock absorbing assembly.

12. A gauge carrier protective housing for use on a tool string of a wireline or a slickline that passes through a well borehole which traverses earth formations and contains fluid, the gauge carrier protective housing for use with a gauge carrier having one or more sensors exposed to the fluid in the well borehole when in operation, the gauge carrier protective housing comprising:

a protective tubular structure encasing a gauge carrier, a first shock absorbing assembly, and a second shock absorbing assembly, the protective tubular structure having a first end including a coupling configured and dimensioned to attach to a tool string and a second end including an adaptor configured and dimensioned to attach to one of an additional section of the tool string, a wireline link jar, a gauge cutter or a terminal end, dimensioned and configured to surround a gauge carrier with the first shock absorbing assembly on the first end of the protective tubular structure corresponding to a first end of a gauge carrier and the second shock absorbing assembly on the second end of the protective tubular structure corresponding to a second end of a gauge carrier, having an outer wall and an inner wall, wherein in operation the outer wall faces a well borehole and is in contact with fluid in the well borehole, and wherein the inner wall is configured to face a gauge carrier and the first and second shock absorbing assemblies, and having a plurality of apertures to permit passage of fluid from the well borehole to one or more sensors exposed to fluid and that are carried on a gauge carrier.

13. The gauge carrier protective housing as in claim 12, wherein:

the coupling has a string-side connecting structure that is configured and dimensioned to connect to the tool string, and a tube-side connecting structure that is configured and dimensioned to connect to the first end of the protective tubular structure; and the adapter has a string-side connecting structure that is configured and dimensioned to connect to one of an additional section of the tool string, the wireline link jar, the gauge cutter or the terminal end, and a tube-side connecting structure that is configured and dimensioned to connect to the second end of the protective tubular structure.

14. The gauge carrier protective housing as in claim 12, wherein:

the first shock absorbing assembly comprises a first spring retainer proximate to tube-side connecting structure of the coupling, a connecting structure configured and dimensioned for connection to a first end of a gauge carrier, a second spring retainer proximate to the connecting structure of the first shock absorbing assembly, and a spring between the first and second spring retainers; and the second shock absorbing assembly comprises a first spring retainer proximate to tube-side connecting structure of the adapter, a connecting structure configured and dimensioned for connection to a second end of a gauge carrier, a second spring retainer proximate to the connecting structure of the second shock absorbing assembly, and a spring between the first and second spring retainers.

15. The gauge carrier protective housing as in claim 13, wherein:

the first shock absorbing assembly comprises a first spring retainer proximate to tube-side connecting structure of the coupling, a connecting structure configured and dimensioned for connection to a first end of a gauge carrier, a second spring retainer proximate to the connecting structure of the first shock absorbing assembly, and a spring between the first and second spring retainers; and the second shock absorbing assembly comprises a first spring retainer proximate to tube-side connecting structure of the adapter, a connecting structure configured and dimensioned for connection to a second end of a gauge carrier, a second spring retainer proximate to the connecting structure of the second shock absorbing assembly, and a spring between the first and second spring retainers.

16. The gauge carrier protective housing as in claim 12, further comprising a gauge carrier within the protective tubular structure and between the first shock absorbing assembly and the second shock absorbing assembly.

* * * * *